Patented June 15, 1943

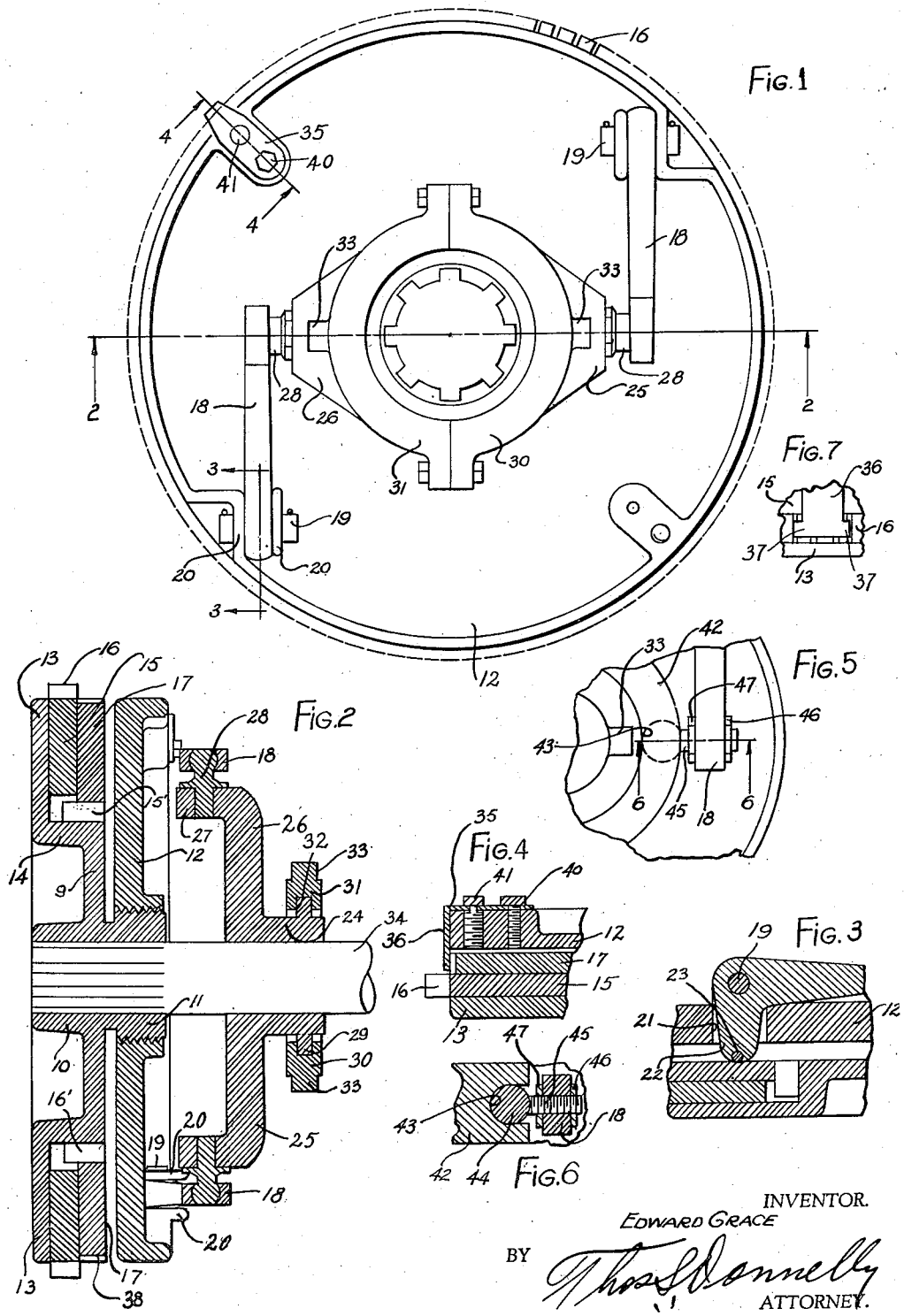
June 15, 1943.  E. GRACE  2,321,809
CLUTCH
Filed Sept. 16, 1940
INVENTOR.
EDWARD GRACE
BY Thos. S. Donnelly
ATTORNEY.

2,321,809

UNITED STATES PATENT OFFICE 2,321,809

CLUTCH

Edward Grace, Detroit, Mich.

Application September 16, 1940, Serial No. 357,020

7 Claims. (Cl. 192—68)

My invention relates to a new and useful improvement in a clutch.

It is an object of the present invention to provide a clutch which may be used on shafts of a maximum size without increasing the diameter of the clutch.

Another object of the invention is the provision of a clutch having actuating members extended chordally of the clutch and provided with rockable presser members which are also directed chordally of the clutch.

It is another object of the invention to provide a clutch of this class which will be simple in structure, economical of manufacture, durable, compact, possessed of a minimum number of parts easily operated and highly efficient in use.

Other objects will appear hereinafter.

It is recognized that various modifications and changes may be made in the detail of structure without departing from the spirit of the invention and it is intended that such variations and modifications shall be embraced herein.

Forming a part of the specification is a drawing in which,

Fig. 1 is an elevational view of the invention.

Fig. 2 is a sectional view taken on line 2—2 of Fig. 1.

Fig. 3 is a fragmentary sectional view taken on line 3—3 of Fig. 1.

Fig. 4 is a fragmentary sectional view taken on line 4—4 of Fig. 1.

Fig. 5 is a fragmentary elevational view showing a slight modification of the invention.

Fig. 6 is a fragmentary sectional view taken on line 6—6 of Fig. 5.

Fig. 7 is a fragmentary elevational view of the periphery illustrating a clip used in the invention.

The invention comprises a disc 9 having splined hub 10, provided with the externally threaded portion 11 on which is threaded a supporting disc 12. The disc 9 is provided with the offset portion 13 and embracing the axially directed portion 14 is a ring 15 having teeth 16 formed on its periphery. This ring 15 is made from suitable friction material and constitutes a friction pad. Formed on a portion of the axially-directed part 14 are teeth 15' with which the teeth 16', formed on the ring 17, are adapted to mesh. This ring 17 serves as a presser plate for clamping the ring or friction pad 15 against the portion 13 of the disc 9, the presser plate 17 being movable axially of the hub 10.

In order to effect the axial movement of the presser plate 17 so as to clamp the pad 15 against the disc portion 13, I provide a pair of rockable arms 18 pivoted at one of their ends by means of the pivot pin 19 on the lugs 20 which are carried by the disc 12. Between these lugs 20 is formed an opening 21 in the disc 12 through which the presser nose 22, forming a part of the arm 18, is adapted to project. The end of this nose or angularly-turned portion 22 is provided with a roller bearing or ball bearing 23. The construction is such that when the arm 18 is rocked on its pivot in one direction, the portion 22 will press the presser plate 17 into position for clamping the friction pad 15 against the disc portion 13 so that the member 15 will rotate in unison with the parts 9 and 17.

A hub 24 is provided with the diametrically opposite, outwardly projecting plates 25 and 26, each of which is provided with the axially directed, angularly turned portion 27 which carries a trunnion 28 to which the other end of the arm 18 is pivotally connected. In use a shaft 34 is projected through the hubs 10 and 24, the hub 10 rotating in unison with the shaft and the hub 24 being free to rotate on the shaft and to move axially thereof. Extending around and projecting outwardly from the hub 24 is the flange 29. This flange 29 is embraced by the ring sections 30 and 31, the flange engaging in the channels 32 of these ring sections. Projecting outwardly from each of the ring sections is a trunnion 33 with which may be engaged a shifter fork or a yoke for effecting a shifting axially of the shaft 34 so as to operate the clutch.

It will be noted that the arms 18 are extended chordally of the disc 12 and that the plates 25 and 26 project outwardly a considerable distance. It is believed obvious that by enlarging the diameter of the hubs 10 and 24, the plates 25 and 26 may be shortened so that it will not be necessary to enlarge the diameter of the disc 12 on the clutch proper. Thus this method of operation and this type of construction lends itself to a clutch manufacture which will be uniform for different sized shafts and permit the enlargement of the bore without requiring an enlargement of the overall size of the clutch itself. By shifting the hub 24 axially of the shaft 34, the arms 18 will be rocked on their pivots. In this rocking movement the hub 24 will also rock on shaft 34 as an axis, thus permitting a maximum swinging of the arms 18 and a maximum efficiency of the operation of the device.

By threading the disc 12 onto the hub 10 a simple and effective means of mounting these parts is provided and one which will afford easy adjustment so that the plate 12 may be moved axially relatively to the disc 9 to compensate for the wear of the pad 15.

In order to lock the disc 12 against reverse rotation, I have provided a spring clip 35 having the angularly turned portion 36 provided with the lateral, downwardly turned wings 37 which serves to engage the shallow teeth 38 formed on the periphery of the presser disc 17. Since this disc does not rotate relatively to the hub, it is obvious that the spring serves to lock the disc 12 against undue rotation on the hub 10. To secure this spring in position, I use a screw 40 which is threaded into the disc 12. A screw 41 is rotatably mounted on the disc 12 and projected outwardly therefrom and threaded through an opening in the spring 35 so that pressure of the angularly turned portion 36 may be adjusted by screwing the screw 41 inwardly or outwardly. An examination of Fig. 4 will indicate that by threading the screw 41 outwardly, the member 35 will be flexed, thus causing the portion 36 to tilt upwardly so that the downwardly turned ends of the lateral wings 37 will rise. A reverse rotation of the screw 41 will effect a reverse movement.

In Fig. 5 and Fig. 6 I have shown a slightly modified form of the invention. In this structure the hub 24 is provided with the angular disc 42, having a groove 43 formed in its periphery in which engages a head 44 carried by a screw 45 which projects through one end of the arms 18 and is secured in position by the nuts 46 and 47.

The operation and advantage of the preferred form of structure are present in the modified form shown in Fig. 5 and Fig. 6, this modification relating only to the method of connecting the free ends of the arms to the axially movable, rockable part. The engagement of the head 44 in the groove 43 permits the rockable movement of the disc 42 as the arms 18 are rocked.

With a clutch constructed in this manner, the various advantages referred to are obtained and a simple and inexpensive clutch is provided.

What I claim as new is:

1. A clutch of the class described comprising a hub adapted for mounting on a shaft for rotation in unison therewith; a radially extending disc carried by said hub; a driven friction member arranged concentric of said hub and engageable with said disc; a presser member arranged concentric of said hub and movable axially thereof for clamping said friction member in fixed relation with said disc; a supporting disc mounted on said hub in fixed relation thereto and adjustable axially thereof; a pair of oppositely directed rocker arms rockably mounted at one of their ends on said supporting disc diametrically opposite each other; a cam portion on each of said rocker arms adapted, upon rocking in one direction, for engaging against said presser member and pressing the same into clamping relation with said friction member; a shaft projected through said hub; a sleeve slidably mounted on said shaft and rotatable relatively thereto; means for connecting the opposite ends of said arms to said sleeve, said arms extending chordally of said supporting disc and said connecting means extending radially outwardly from said sleeve and means for sliding said sleeve axially of said shaft while permitting rotation of the same thereon.

2. A clutch of the class described comprising a shaft; a hub fixedly mounted on said shaft and rotatable in unison therewith; a disc carried by and projecting radially outwardly from said hub; an annular friction member engageable with said disc, and arranged concentric of said shaft; an annular presser member arranged concentric of said shaft and movable axially thereof for clamping said friction member against said disc; a stationary supporting disc mounted on said hub and adjustable axially thereof; a pair of oppositely directed rocker arms pivotally mounted at one of their ends on said supporting disc and extended chordally of said supporting disc, said arms terminating at their opposite ends at points substantially, diametrically opposite each other relative to said shaft; rotatable and axially movable means on said shaft; and means for connecting said opposite ends of said arms to said axially movable means.

3. A clutch of the class described comprising a shaft; a hub fixedly mounted on said shaft and rotatable in unison therewith; a disc carried by and projecting radially outwardly from said hub; an annular friction member engageable with said disc, and arranged concentric of said shaft; an annular presser member arranged concentric of said shaft and movable axially thereof for clamping said friction member against said disc; a stationary supporting disc mounted on said hub and adjustable axially thereof; a pair of oppositely directed rocker arms pivotally mounted at one of their ends on said supporting disc and extended chordally thereof, said arms terminating at their opposite ends at points substantially, diametrically opposite each other relative to said shaft; rotatable and axially movable means on said shaft; a means for connecting said opposite ends of said arms to said axially movable means; and cam means on the pivoted ends of said arms for, upon axial movement of said axially movable means in one direction, engaging said presser member and pressing said friction member into clamping relation with said first named disc.

4. A clutch of the class described comprising a shaft; a hub fixedly mounted on said shaft and rotatable in unison therewith; a disc carried by and projecting radially outwardly from said hub; an annular friction member engageable with said disc, and arranged concentric of said shaft; an annular presser member arranged concentric of said shaft and movable axially thereof for clamping said friction member against said disc; a stationary supporting disc mounted on said hub and adjustable axially thereof; a pair of oppositely directed rocker arms pivotally mounted at one of their ends on said supporting disc and extended chordally thereof said arms terminating at their opposite ends at points substantially, diametrically opposite each other relative to said shaft; rotatable and axially movable means on said shaft; a means for connecting said opposite ends of said arms to said rotatable and axially movable means; cam means on the pivoted ends of said arms for, upon axial movement of said rotatable and axially moveable means in one direction, engaging said presser member and pressing said friction member into clamping relation with said first named disc; and friction-reducing means carried by said cam mechanism engageable with said presser member.

5. A clutch of the class described comprising a shaft; a hub fixedly mounted on said shaft and rotatable in unison therewith; a disc carried by and projecting radially outwardly from said hub; an annular friction member engageable with said disc, and arranged concentric of said shaft; an annular presser member arranged concentric of said shaft and movable axially thereof for clamping said friction member against said disc; a stationary supporting disc mounted on said hub and adjustable axially thereof; a pair of oppositely directed rocker arms pivotally mounted at one of their ends on said supporting disc and extended chordally thereof said arms terminating at their opposite ends at points substantially, diametrically opposite each other relative to said shaft; rotatable and axially movable means on said shaft; a means for connecting said opposite ends of said arms to said axially movable means; cam means on the pivoted ends of said arms for, upon axial movement of said axial means in one direction, engaging said presser member and pressing said friction member into clamping relation with said first named disc; a friction-reducing means carried by said cam mechanism engageable with said presser member; and a non-rotatable means for moving said sleeve axially of said shaft while permitting rotation of the same thereon.

6. A clutch of the class described comprising a shaft; a hub mounted thereon and rotatable in unison therewith; a radially outwardly projecting disc carried by said hub; an annular friction member arranged concentric of said hub and engageable with said disc; an annular presser member rotatable in unison with said hub and movable axially thereof and adapted for clamping said friction member in fixed relation to said disc for effecting a rotation of said friction member and said disc in unison with each other; a supporting disc fixedly mounted on said hub and adjustable axially thereof and having openings formed therethrough; a pair of oppositely directed rocker arms rockably mounted at one of their ends on said supporting disc diametrically opposite each other and extending chordally thereof; a cam portion on the pivoted ends of said arms projectable through said openings and engageable with said presser member for moving the same axially of said hub into clamping relation with said friction member; a sleeve slideably and rotatably mounted on said shaft; means projected radially outwardly from opposite sides of said sleeve for connecting the free ends of said arms thereto; and means for sliding said sleeve axially of said shaft while permitting rotation of the same on said shaft.

7. A clutch of the class described, comprising: a hub adapted for mounting on a shaft for rotation in unison therewith; a radially extending disc carried by said hub and off-set between the center and periphery thereof to provide an axially directed portion; peripheral teeth on said axially directed portion and extending axially; a driven friction member arranged concentric of said hub and movable axially thereof and engageable with said disc; an annular presser member arranged concentric of said hub and movable axially thereof for clamping said friction member in fixed relation to said disc; internal teeth on said presser member meshing with the teeth on said axially directed portion of said disc; a supporting disc mounted on said hub in fixed relation thereto; a pair of oppositely directed rocker arms rockably mounted adjacent one of their ends on said supporting disc diametrically opposite each other; a cam portion on each of said rocker arms, adapted, upon rocking in one direction, for engaging against said presser member and pressing the same into clamping relation with said friction member; a shaft projected through said hub; a sleeve slidably mounted on said shaft and rotatable thereon; means for connecting the opposite ends of said arms to said sleeve, said arms extending chordally of said supporting disc and said connecting means extending radially outwardly from said sleeve; and means for sliding said sleeve axially of said shaft while permitting rotation of the same thereon.

EDWARD GRACE.